(12) United States Patent
Ge et al.

(10) Patent No.: US 9,432,614 B2
(45) Date of Patent: Aug. 30, 2016

(54) INTEGRATED DOWNSCALE IN VIDEO CORE

(71) Applicant: QUALCOMM Incorporated, San Diego, CA (US)

(72) Inventors: Feng Ge, San Diego, CA (US); Hariharan G. Lalgudi, San Diego, CA (US); Sumit Mohan, San Diego, CA (US); Kai Wang, San Diego, CA (US); Narendranath Malayath, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 242 days.

(21) Appl. No.: 13/801,220

(22) Filed: Mar. 13, 2013

(65) Prior Publication Data

US 2014/0269895 A1 Sep. 18, 2014

(51) Int. Cl.
*H04N 19/00* (2014.01)
*H04N 7/01* (2006.01)
*H04N 19/42* (2014.01)
*H04N 19/59* (2014.01)
*H04N 19/33* (2014.01)

(52) U.S. Cl.
CPC ............ *H04N 7/0117* (2013.01); *H04N 19/42* (2014.11); *H04N 19/59* (2014.11); *H04N 19/33* (2014.11)

(58) Field of Classification Search
CPC ..... H04N 7/0117; H04N 19/42; H04N 19/59
USPC ........................................ 375/240.26, 240.29
See application file for complete search history.

(56) References Cited

U.S. PATENT DOCUMENTS

| 6,157,396 | A | * | 12/2000 | Margulis et al. .............. 345/506 |
| 6,768,774 | B1 | | 7/2004 | MacInnis et al. |
| 7,379,496 | B2 | | 5/2008 | Holcomb et al. |
| 8,250,618 | B2 | | 8/2012 | Rosenzweig et al. |
| 2003/0043918 | A1 | * | 3/2003 | Jiang et al. .............. 375/240.25 |
| 2005/0175099 | A1 | * | 8/2005 | Sarkijarvi et al. ....... 375/240.16 |
| 2005/0255913 | A1 | * | 11/2005 | Cok ................................ 463/31 |
| 2006/0215764 | A1 | * | 9/2006 | Malvar .................... 375/240.18 |
| 2007/0058713 | A1 | | 3/2007 | Shen et al. |

(Continued)

FOREIGN PATENT DOCUMENTS

WO WO-9827741 A1 6/1998

OTHER PUBLICATIONS

Nam, Hyeong-Min, "A Complexity Scalable H.264 Decoder With Downsizing Capability for Mobile Devices". IEEE Transactions on Consumer Electronics, vol. 56, No. 2, May 2010 pp. 1025-1033.*

(Continued)

*Primary Examiner* — Jeffery Williams
(74) *Attorney, Agent, or Firm* — Knobbe Martens Olson & Bear LLP (57) ABSTRACT

Implementations include video image processing systems, methods, and apparatus for integrated video downscale in a video core. The downscaler computes and writes a display frame to an external memory. This frame may have the same resolution as a target display device (e.g., mobile device). The target display device then reads this display frame, rather than the original higher resolution frame. By enabling downscale during encoding/decoding, the device can conserve resources such as memory bandwidth, memory access, bus bandwidth, and power consumption associated with separately downscaling a frame of video data.

18 Claims, 7 Drawing Sheets

(56) References Cited

U.S. PATENT DOCUMENTS

2008/0043831 A1* 2/2008 Sethuraman et al. ........ 375/240
2009/0320081 A1 12/2009 Chui et al.
2010/0066762 A1* 3/2010 Yeh et al. .................... 345/629
2010/0246676 A1 9/2010 Cao et al.

OTHER PUBLICATIONS

International Search Report and Written Opinion—PCT/US2014/018736—ISA/EPO—Jul. 17, 2014.
Nam H.M., et al., "A complexity scalable H.264 decoder with downsizing capability for mobile devices", IEEE Transactions on Consumer Electronics, May 2010, pp. 1025-1033.

* cited by examiner

INTEGRATED DOWNSCALE IN VIDEO CORE

BACKGROUND

1. Field

The present implementations relate to image processing, and in particular, to video image processing systems, methods, and apparatus for integrated video downscale in a video core.

2. Background

A wide range of electronic devices, including mobile wireless communication devices, personal digital assistants (PDAs), laptop computers, desktop computers, digital cameras, digital recording devices, and the like, have an assortment of image and video display capabilities. Some devices are capable of displaying two-dimensional (2D) images and video, three-dimensional (3D) images and video, or both.

Video data may be provided in varying formats. The formats may vary in the resolution of the video data provided. For example, some formats may provide high definition video data (e.g., 1920 by 1080) while other formats may provide lower resolution video data (e.g., 864 by 480).

A display device may be configured to present video data at a limited resolution. For example, a mobile device may be configured to display video data at a resolution of 864 by 480. The display device may be configured for a resolution based on the size of the available display and/or the resources available to the display device such as processor resources, power resources, bandwidth resources, and the like. Notwithstanding the particular configuration of each display device, the display device may receive video data at a higher resolution than the device may be configured to display. The process of converting the higher resolution video data into a lower resolution may generally be referred to as downscaling.

Downscaling may be performed on an encoding device or a decoding device. When implemented in an encoding device, the device receives the source video data and encodes a downscaled version of the video data for transmission to a display device. When implemented in a decoding device, the device may receive the reference video data, decode the reference video data, and generate a lower resolution version of the reference video data. In some implementations, the decoding device is included in the display device. In some implementations, the decoding device may be coupled with the display device.

As the process of downscaling also utilizes device resources, efficient systems and methods for performing downscaling may be desirable.

SUMMARY

Various embodiments of systems, methods and devices within the scope of the appended claims each have several aspects, no single one of which is solely responsible for the desirable attributes described herein. Without limiting the scope of the appended claims, some prominent features are described herein. After considering this discussion, and particularly after reading the section entitled "Detailed Description" one will understand how the features of various implementations are used to provide integrated downscaling in a video core.

In one innovative aspect, an electronic device for processing video data is provided. The device includes a receiver configured to receive input video data. The device includes a video coder configured to generate output video data. The video coder includes a video encoder and a video decoder. The video coder further includes a downscaler coupled with the encoder and the decoder, the downscaler configured to generate a downscaled version of the input video data during encoding or decoding, wherein the output video data includes the downscaled version of the input video data.

In a further innovative aspect, a method of processing video data is provided. The method includes receiving input video data. The method also includes generating output video data, wherein generating output video data includes selectively encoding and decoding the input video data, wherein a downscaled version of the input video data is generated during the encoding or decoding, wherein the output video data includes the downscaled version of the input video data.

In yet another innovative aspect, a further electronic device for processing video data is provided. The electronic device includes means for receiving input video data. The electronic device further includes means for generating output video data, wherein generating output video data includes selectively encoding and decoding the input video data, wherein a downscaled version of the input video data is generated during the encoding or decoding, wherein the output video data includes the downscaled version of the input video data.

A computer-readable storage medium comprising instructions executable by a processor of an apparatus is provided in a further innovative aspect. The instructions cause the apparatus to receive input video data. The instructions further cause the apparatus to generate output video data, wherein generating output video data includes selectively encoding and decoding the input video data, wherein a downscaled version of the input video data is generated during the encoding or decoding, wherein the output video data includes the downscaled version of the input video data.

BRIEF DESCRIPTION OF THE DRAWINGS

So that the manner in which features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

In accordance with common practice, the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DETAILED DESCRIPTION

A downscaler integrated within a video hardware codec and related methods are described. The downscaler computes and writes a display frame to an external memory. This frame may have the same resolution as a target display device (e.g., mobile device, cellphone). The target display device then reads this display frame, rather than the original higher resolution frame. By enabling downscale during encoding/decoding, the device can conserve resources such as memory bandwidth, memory access, bus bandwidth, and power consumption associated with separately downscaling a frame of video data.

The processes described include the integrated downscaler in block-based encoding and decoding processes. Based on the information generated as the video is encoded or decoded, the downscaled version of the video data may be generated. If implemented as a decoder, the downscaled version may be displayed. If implemented as an encoder, the downscaled version may be transmitted to a target display device.

A non-limiting advantage of the described features includes the integration of the downscaling within the video core. During the processing of an image by the video core, information may be generated which may be used to downscale the image. In some systems, the image is processed by the video core, stored, and later downscaled. This process may include increased resource consumption such as power and processing resources as the image is manipulated twice. Furthermore, the stored high definition version may not be needed by the target device. Accordingly, memory resources may also be expended in such an implementation.

When integrating the downscaling with the video core, the image data may be downscaled during the decoding process. In addition to providing a savings in resources, the integrated approach may also reduce the time to generate the downscaled image. These and further benefits will manifest themselves through further explanation of the aspects related to the integrated downscaling.

In the following description, specific details are given to provide a thorough understanding of the examples. However, it will be understood by one of ordinary skill in the art that the examples may be practiced without these specific details. For example, electrical components/devices may be shown in block diagrams in order not to obscure the examples in unnecessary detail. In other instances, such components, other structures and techniques may be shown in detail to further explain the examples.

It is also noted that the examples may be described as a process, which is depicted as a flowchart, a flow diagram, a finite state diagram, a structure diagram, or a block diagram. Although a flowchart may describe the operations as a sequential process, many of the operations can be performed in parallel, or concurrently, and the process can be repeated. In addition, the order of the operations may be re-arranged. A process is terminated when its operations are completed. A process may correspond to a method, a function, a procedure, a subroutine, a subprogram, etc. When a process corresponds to a software function, its termination corresponds to a return of the function to the calling function or the main function.

Those of skill in the art will understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Various aspects of embodiments within the scope of the appended claims are described below. It should be apparent that the aspects described herein may be embodied in a wide variety of forms and that any specific structure and/or function described herein is merely illustrative. Based on the present disclosure one skilled in the art should appreciate that an aspect described herein may be implemented independently of any other aspects and that two or more of these aspects may be combined in various ways. For example, an apparatus may be implemented and/or a method may be practiced using any number of the aspects set forth herein. In addition, such an apparatus may be implemented and/or such a method may be practiced using other structure and/or functionality in addition to or other than one or more of the aspects set forth herein.

Figure 1:
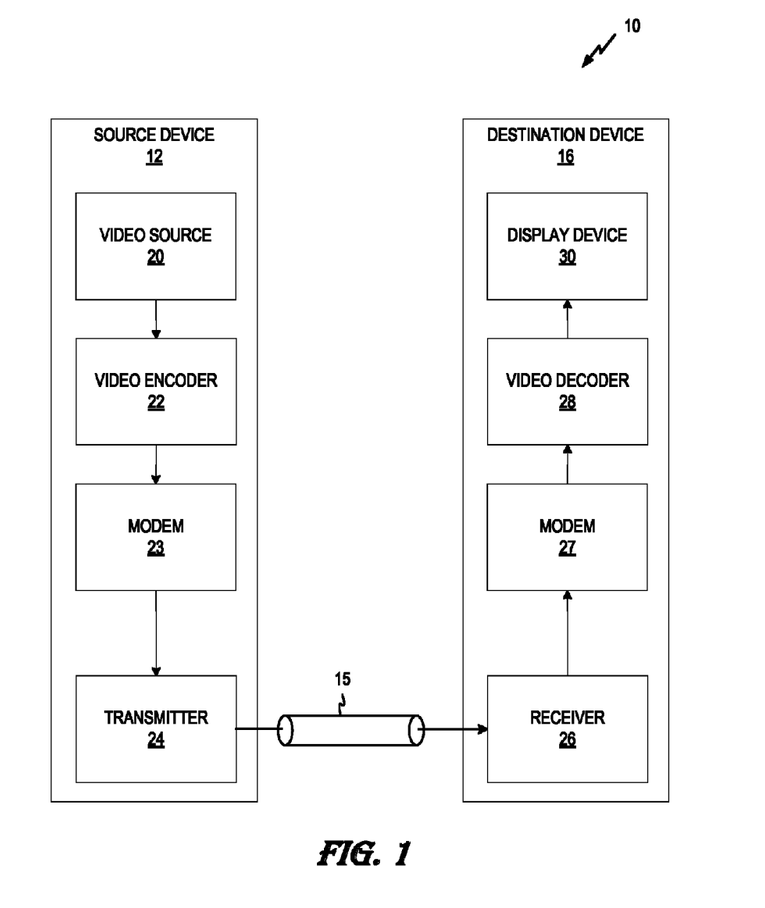
FIG. 1 shows a functional block diagram of an exemplary video encoding and decoding system.

FIG. 1 shows a functional block diagram of an exemplary video encoding and decoding system. As shown in FIG. 1, system 10 includes a source device 12 that transmits encoded video to a destination device 16 via a communication channel 15. Source device 12 and destination device 16 may comprise any of a wide range of devices, including mobile devices or generally fixed devices. In some cases, source device 12 and destination device 16 comprise wireless communication devices, such as wireless handsets, so-called cellular or satellite radiotelephones, personal digital assistants (PDAs), mobile media players, or any devices that can communicate video information over a communication channel 15, which may or may not be wireless. However, the techniques of this disclosure, which concern the integration of downscaling in a video core, may be used in many different systems and settings. FIG. 1 is merely one example of such a system.

In the example of FIG. 1, source device 12 may include a video source 20, video encoder 22, a modulator/demodulator (modem) 23, and a transmitter 24. Destination device 16 may include a receiver 26, a modem 27, a video decoder 28, and a display device 30. In accordance with this disclosure, video encoder 22 of source device 12 may be configured to encode a sequence of frames of a reference image. The video encoder 22 may be configured to generate a downscaled version of the reference image. Modem 23 and transmitter 24 may modulate and transmit wireless signals to destination device 16. In this way, source device 12 communicates the encoded reference sequence along with the 3D conversion information to destination device 16.

Receiver 26 and modem 27 receive and demodulate wireless signals received from source device 12. Accordingly, video decoder 28 may receive the sequence of frames of the reference image. In addition or in the alternative, the video decoder 28 may receive the downscaled frames of the reference image. The video decoder 28 may also be configured for downscaling. The video decoder 28 may generate the downscaled version of the reference image based on the sequence of frames of the reference image. The video decoder 28 may generate the downscaled frame based on the target display for the video.

As mentioned, the illustrated system 10 of FIG. 1 is merely exemplary. The techniques of this disclosure may be extended to any coding device or technique that supports first order block-based video coding.

Source device 12 and destination device 16 are merely examples of such coding devices in which source device 12 generates coded video data for transmission to destination device 16. In some cases, devices 12, 16 may operate in a substantially symmetrical manner such that, each of devices 12, 16 includes video encoding and decoding components. Hence, system 10 may support one-way or two-way video transmission between video devices 12, 16, e.g., for video streaming, video playback, video broadcasting, or video telephony.

Video source 20 of source device 12 may include a video capture device, such as a video camera, a video archive containing previously captured video, or a video feed from a video content provider. As a further alternative, video source 20 may generate computer graphics-based data as the source video, or a combination of live video, archived video, and computer-generated video. In some cases, if video source 20 is a video camera, source device 12 and destination device 16 may form so-called camera phones or video phones. In each case, the captured, pre-captured or computer-generated video may be encoded by video encoder 22. The encoded video information may then be modulated by modem 23 according to a communication standard, e.g., such as code division multiple access (CDMA) or another communication standard, and transmitted to destination device 16 via transmitter 24. Modem 23 may include various mixers, filters, amplifiers or other components designed for signal modulation. Transmitter 24 may include circuits designed for transmitting data, including amplifiers, filters, and one or more antennas.

Receiver 26 of destination device 16 receives information over channel 15, and modem 27 demodulates the information. Again, the video encoding process may implement one or more of the techniques described herein to generate a downscaled version of the video. The information communicated over channel 15 may include information defined by video encoder 22, which may be used by video decoder 28 consistent with this disclosure. Display device 30 displays the decoded video data to a user, and may comprise any of a variety of display devices such as a cathode ray tube, a liquid crystal display (LCD), a plasma display, an organic light emitting diode (OLED) display, or another type of display device.

In the example of FIG. 1, communication channel 15 may comprise any wireless or wired communication medium, such as a radio frequency (RF) spectrum or one or more physical transmission lines, or any combination of wireless and wired media. Accordingly, modem 23 and transmitter 24 may support many possible wireless protocols, wired protocols or wired and wireless protocols. Communication channel 15 may form part of a packet-based network, such as a local area network (LAN), a wide-area network (WAN), or a global network, such as the Internet, comprising an interconnection of one or more networks. Communication channel 15 generally represents any suitable communication medium, or collection of different communication media, for transmitting video data from source device 12 to destination device 16. Communication channel 15 may include routers, switches, base stations, or any other equipment that may be useful to facilitate communication from source device 12 to destination device 16. The techniques of this disclosure do not necessarily require communication of encoded data from one device to another, and may apply to encoding scenarios without the reciprocal decoding. Also, aspects of this disclosure may apply to decoding scenarios without the reciprocal encoding.

Video encoder 22 and video decoder 28 may operate consistent with a video compression standard, such as the ITU-T H.264 standard, alternatively described as MPEG-4, Part 10, and Advanced Video Coding (AVC). The techniques of this disclosure, however, are not limited to any particular coding standard or extensions thereof. Although not shown in FIG. 1, in some aspects, video encoder 22 and video decoder 28 may each be integrated with an audio encoder and decoder, and may include appropriate MUX-DEMUX units, or other hardware and software, to handle encoding of both audio and video in a common data stream or separate data streams. If applicable, MUX-DEMUX units may conform to a multiplexer protocol (e.g., ITU H.223) or other protocols such as the user datagram protocol (UDP).

Video encoder 22 and video decoder 28 each may be implemented as one or more microprocessors, digital signal processors (DSPs), application specific integrated circuits (ASICs), field programmable gate arrays (FPGAs), discrete logic circuitry, software executing on a microprocessor or other platform, hardware, firmware or any combinations thereof. Each of video encoder 22 and video decoder 28 may be included in one or more encoders or decoders, either of which may be integrated as part of a combined encoder/decoder (CODEC) in a respective mobile device, subscriber device, broadcast device, server, or the like.

A video sequence typically includes a series of video frames. Video encoder 22 and video decoder 28 may operate on video blocks within individual video frames in order to encode and decode the video data. The video blocks may have fixed or varying sizes, and may differ in size according to a specified coding standard. Each video frame may include a series of slices or other independently decodable units. Each slice may include a series of macroblocks, which may be arranged into sub-blocks. As an example, the ITU-T H.264 standard supports intra prediction in various block sizes, such as 16 by 16, 8 by 8, or 4 by 4 for luma components, and 8 by 8 for chroma components, as well as inter prediction in various block sizes, such as 16 by 16, 16 by 8, 8 by 16, 8 by 8, 8 by 4, 4 by 8 and 4 by 4 for luma components and corresponding scaled sizes for chroma components. Video blocks may comprise blocks of pixel data, or blocks of transformation coefficients, e.g., following a transformation process such as discrete cosine transform or a conceptually similar transformation process.

Macroblocks or other video blocks may be grouped into decodable units such as slices, frames or other independent units. Each slice may be an independently decodable unit of a video frame. Alternatively, frames themselves may be decodable units, or other portions of a frame may be defined as decodable units. In this disclosure, the term "coded unit" refers to any independently decodable unit of a video frame such as an entire frame, a slice of a frame, a group of pictures (GOPs), or another independently decodable unit defined according to the coding techniques used.

For ease of description, reference will be made to frames, blocks, macroblocks, and the like. However, it will be understood that other methods of representing video may be used consistent with the described downscaling processes described. For example, the video data may be represented using coding units and/or additional logical and/or physical organizational structure(s).

Figure 2:
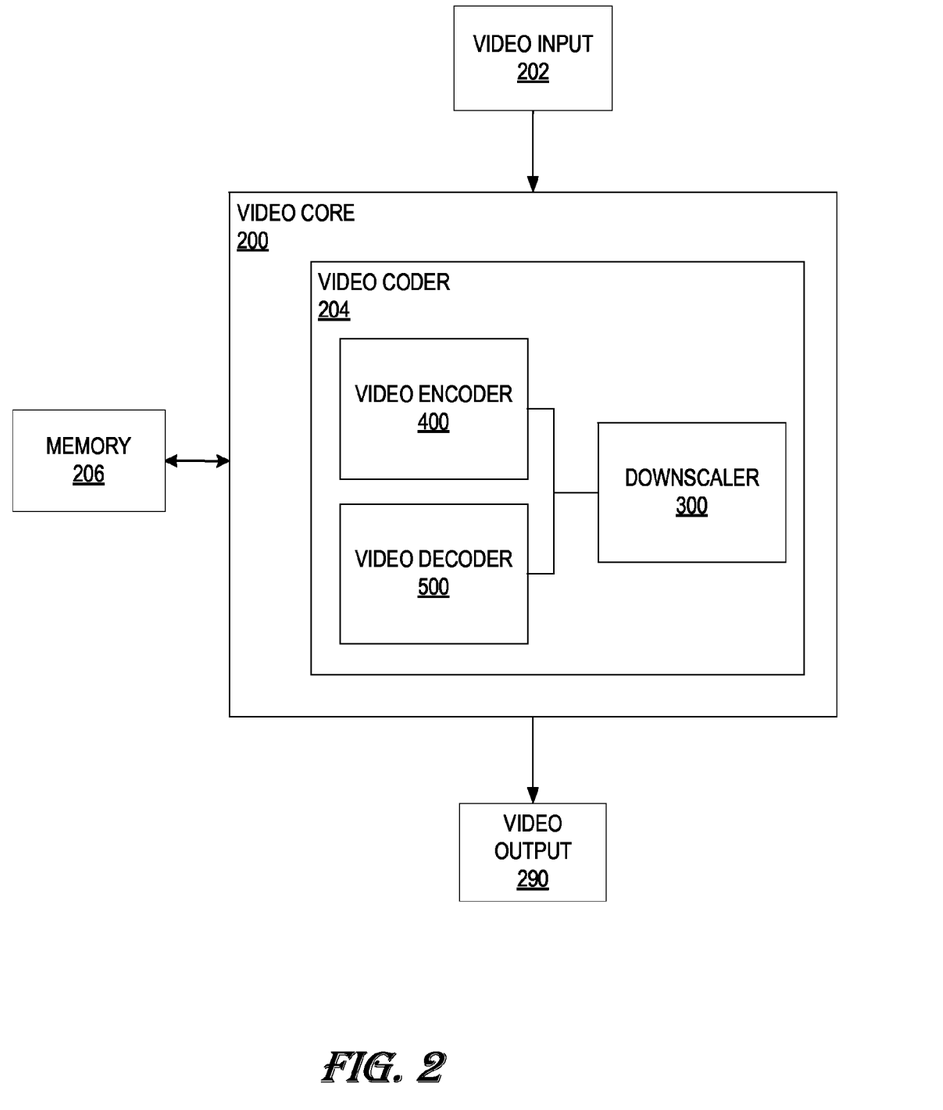
FIG. 2 shows a functional block diagram of an exemplary video core including an integrated downscaler.

FIG. 2 shows a functional block diagram of an exemplary video core including an integrated downscaler. The video core 200 is an electronic device which receives a video input 202 and generates a video output 290. The video core 200 may include a video coder 204. The video coder 204 may be configured to perform encoding and/or decoding of the input video 202. The configuration may be stored in memory 206 and read by the video coder 204. For example, the video coder 204 may be configured to encode and decode video in a certain format, at certain bit rate, at a specified resolution, and the like. Each time the video coder 204 processes video, the configuration information may be read to establish the processing to be performed by the video coder 204. While the memory 206 is shown as an element outside the video core 200, in some implementations, the memory 206 may be integrated with the video core 200 and/or the video coder 204. Furthermore, the memory 206 is shown as a single element, it may be desirable, in some implementations, to provide multiple memories to support the processing of the video core 200.

In some implementations, the video coder 204 may be adaptively configured. For example, the input video 202 may be preprocessed to determine its type. In some implementations, the preprocessing may include determining characteristics of the device in which the video core 200 is included. Such characteristics may include the available power, available bandwidth, available processing resources, coupled devices (e.g., displays), available memory, and the like. In such a way, the video coder 204 may be adaptively configured in consideration of its operational environment.

The video coder 204 may include a video encoder 400, a video decoder 500, and a downscaler 300. The downscaler 300, the video encoder 400, and the video decoder 500 will be described in further detail below.

The video core 200 may include additional processing elements. For example, the video core 200 may include pre-processing elements configured to process the video input 202 before the video coder 204. One example of a pre-processing element is a decryption unit configured to decrypt an encrypted video input 202.

Similarly, the video core may include post-processing elements configured to process the video data generated by the video coder. One example of a post-processing element is an encryption unit configured to encrypt the video data prior to output.

Figure 3:
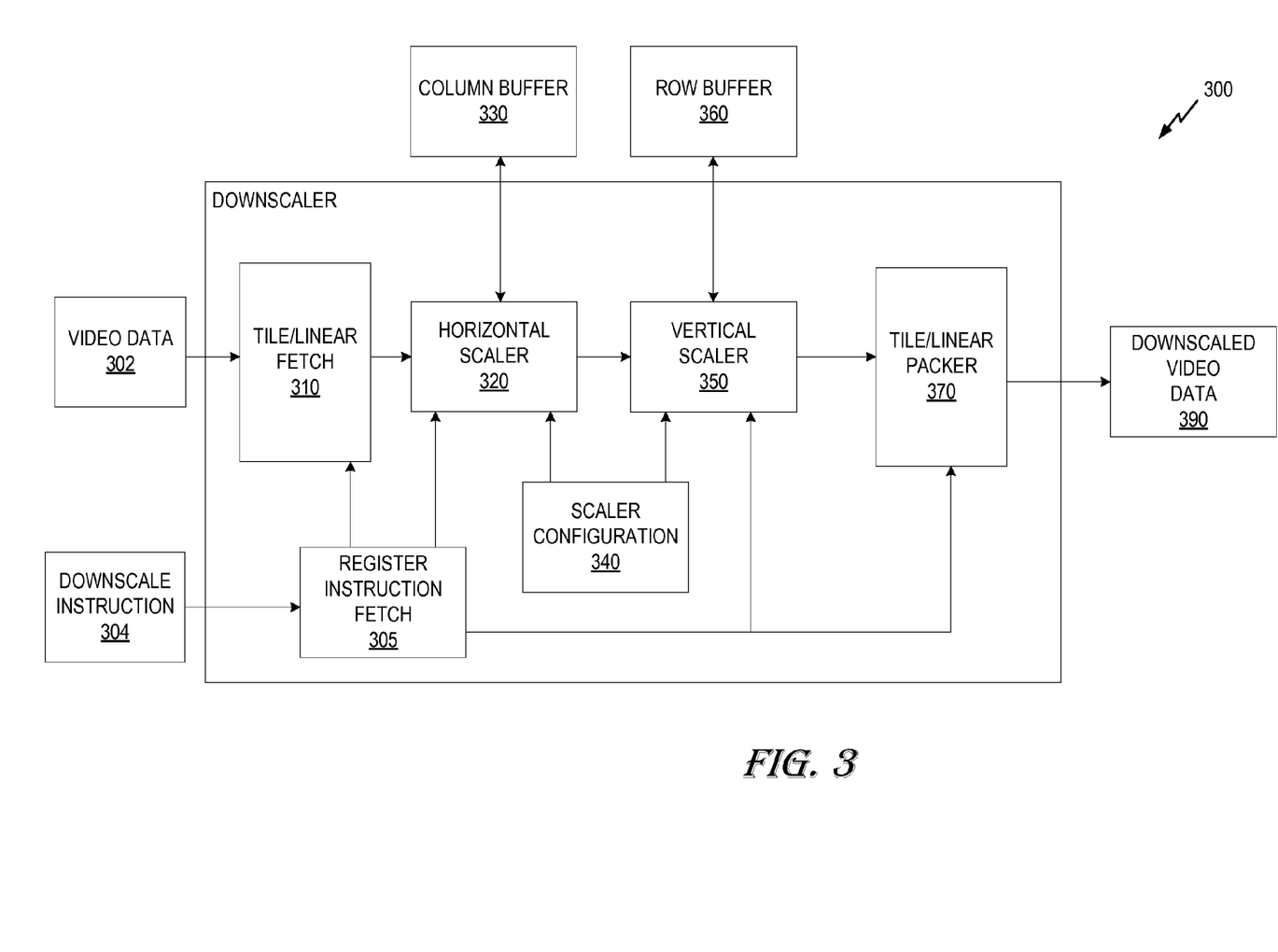
FIG. 3 shows a functional block diagram of an exemplary downscaler.

FIG. 3 shows a functional block diagram of an exemplary downscaler. One input the downscaler 300 may receive is video data 302. The video data 302 may be encoded video data or raw video data. For example, the downscaler 300 may be configured to downscale video data as part of the encoding process. In such implementations, the video data 302 may be raw. The downscaler 300 may be configured to downscale video data as part of the decoding process. In these implementations, the video data 302 may be encoded video data.

The downscaler 300 may also receive one or more downscale instructions 304. The downscale instructions 304 provide information to control the downscaling function. For example, if the downscaler is operating on interlaced video input, how portions of the video data 302 are retrieved for downscaling and stored after downscaling may be affected. The downscale instructions 304 may be stored in a register instruction fetch 305 included in the downscaler 300.

The downscale instructions 304 and the video data 302 may be provided to a tile/linear fetch 310 included in the downscaler 300. The tile/linear fetch 310 may be configured to obtain portions of the video data 302 stored in memory.

The obtained portions of video data may be provided to a horizontal scaler 320. The horizontal scaler 320 may also be configured to receive one or more downscale instructions 304 from the register instruction fetch 305. The horizontal scaler 320 may be further configured to receive scaler configuration values from a scaler configuration 340.

The scaler configuration 340 stores configurations used during the downscale process. For example, the scaler configuration 340 may include a lookup table. The lookup table may include scaling values for horizontal and or vertical downscaling. The scaling values may be represented, for example, as a percentage, a ratio, or a function. The scaler configuration 340 may store the configurations in a static memory storage. In some implementations the scaler configuration 340 may be updated such as via signaling from a device coupled with the downscaler 300 or an application which may use the downscaler 300. In one implementation, the scaler configuration 340 may include 58 entries each entry corresponding to a downscaling ratio.

The horizontal scaler 320 may also be configured to read and or write scaled horizontal video data from/to a column buffer 330. The column buffer 330 is shown outside the downscaler 300. In some implementations, the column buffer 330 may be implemented as part of the downscaler 300. The column buffer 330 may be configured to accumulate downscaled values generated by the horizontal scaler 320. The column buffer 330 may store luminance and or chrominance values for the downscaled video. As one example, the column buffer 330 may include 40 entries each entry 15 bits long. This example may be suitable for storing luminance values. The column buffer 330 may also include 48 entries of 15 bits in length for storing chrominance blue and chrominance red values. In some implementations, the column buffer 330 may be implemented as a single buffer for storing chrominance and luminance values. In some implementations, separate column buffers may be included, one for storing luminance values and one for storing chrominance values.

The horizontally scaled video data may then be provided to a vertical scaler 350 included in the downscaler 300. The vertical scaler 350 may be configured to downscale the video data along the vertical direction. As with the horizontal scaler 320, the vertical scaler 350 may obtain instructions from the register instruction fetch 305 and scaler configuration values from the scaler configuration 340. The vertical scaler 350 may be configured to read and/or write values to a row buffer 360. The row buffer 360 may be configured to accumulate downscaled values generated by the vertical scaler 350. The row buffer 360 may store luminance and/or chrominance values for the downscaled video. As one example, the row buffer 360 may include 1920 entries each entry 15 bits long. This example may be suitable for storing luminance values. The row buffer 360 may also include 1920 entries each 15 bits long for storing blue/red chrominance values. In some implementations, the row buffer 360 may be implemented as a single buffer for storing chrominance and luminance values. In some implementations, separate row buffers may be included, one for storing luminance values and one for storing chrominance values.

The downscaled video data may then be provided to a tile/linear packer 370. The tile/linear packer 370 may be configured to construct downscaled video data 390 based on the scaled rows and columns. The generation of the downscaled video data 390 by the tile/linear packer 370 may be based on the downscale instructions 304 obtained by the tile/linear packer 370 from the register instruction fetch 305. As one example, the tile/linear packer 370 may be configured to store the downscaled video data 390 in downscale RAM. The downscale RAM may be implemented as four RAM units, each RAM unit including 384 entries, each entry including 32 bits. The downscaled video data 390 may be provided (e.g., stored, transmitted, or otherwise made available) in other forms without departing from the scope of the disclosure.

In some implementations, the tile/linear packer 370 may also be configured to transmit a control signal. The control signal may be used for subsequent processing of the downscaled video data 390. For example, a write data mover included in an encoder or decoder may detect the control signal and continue encoding or decoding processes.

The downscaler 300 shown in FIG. 3 may dynamically process encoded or decoded video data for downscaling. Accordingly, the downscaler 300 may be shared by the video encoder 400 and the video decoder 500. Furthermore, the configuration allows the downscaler 300 to operate on a portion of the video data 302, without necessarily obtaining a fully encoded or decoded version. In addition, the portion of the video data 302 may be downscaled before completing the encoding or decoding of the portion.

Figure 4:
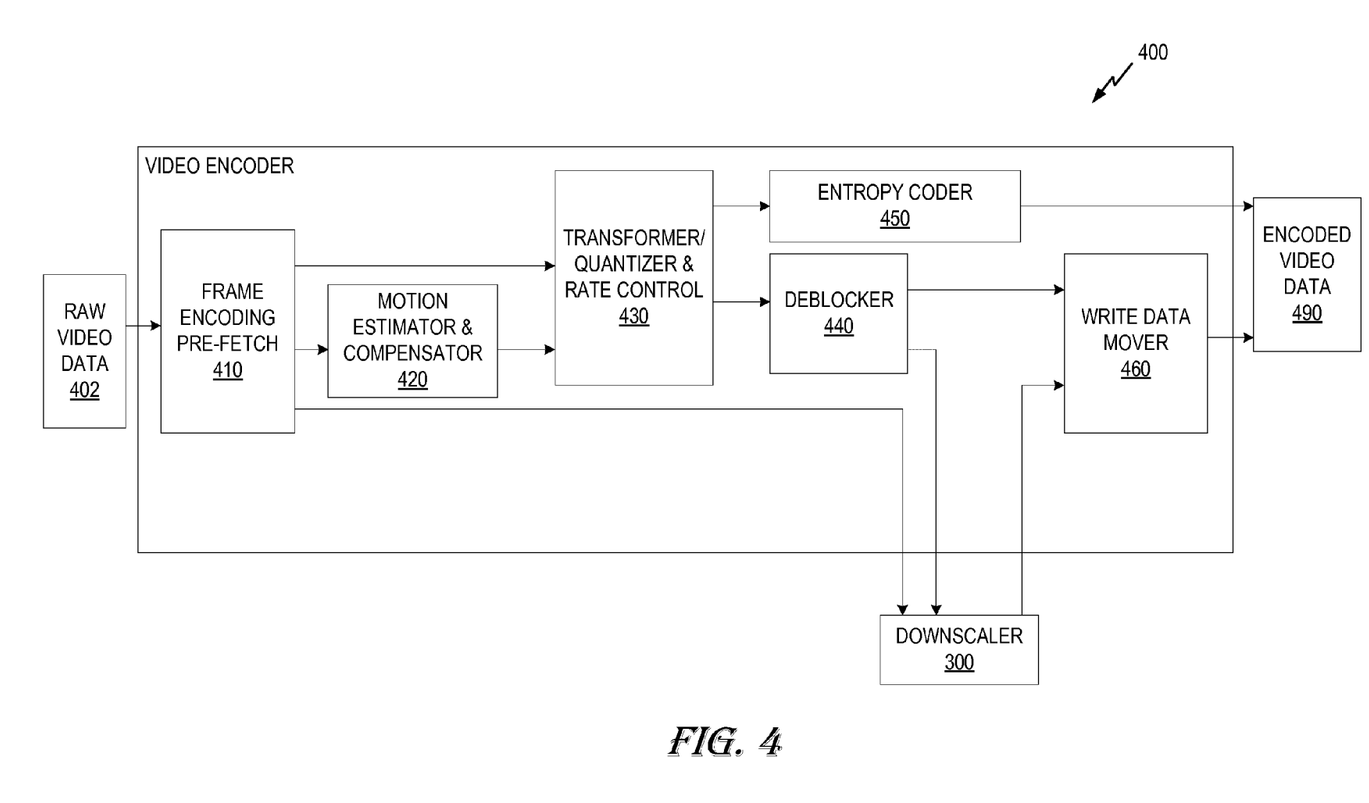
FIG. 4 shows a functional block diagram of an exemplary video encoder.

FIG. 4 shows a functional block diagram of an exemplary video encoder. The video encoder 400 receives as an input raw video data 402. The raw video data 402 may be received from a variety of sources such as a sensor (e.g., a camera), a memory, a network location, or the like.

A frame encoding prefetch 410 may be included in the video encoder 400. The frame encoding prefetch 410 may be configured to portions of the raw video data 402 for the encoding process. For example, the frame encoding prefetch 410 may be configured to obtain a current frame of the raw video data 402 to be encoded. The frame encoding prefetch 410 may be configured to obtain a reference frame of the raw video data 402. The reference frame may be used to encode the current frame.

The reference frame may be provided to a motion estimator and compensator 420. The motion estimator and compensator 420 may be configured to generate a motion information for current frame. The motion estimator and compensator 420 may generate its values based on the current and reference frames obtained by the frame encoding prefetch 410. For example, the motion estimator and compensator 420 may generate generating motion vectors, which estimate motion for video blocks. A motion vector, for example, may indicate the displacement of a predictive block within a predictive input frame (or other coded unit) relative to the current block being coded within the current frame (or other coded unit). A predictive block is a block that is found to closely match the block to be coded, in terms of pixel difference, which may be determined by sum of absolute difference (SAD), sum of square difference (SSD), or other difference metrics. A motion vector may also indicate displacement of a partition of a macroblock. Motion compensation may include calculation of prediction data based on the predictive block. The information generated by the motion estimator and compensator 420 may be provided to a transformer/quantizer and rate control unit 430.

The transformer/quantizer and rate control unit 430 may also obtain the frames from the frame encoding prefetch 410. The transformer/quantizer and rate control unit 430 may be configured to allocate bit budgets over a certain period of time to achieve target bit rate for a certain visual quality. Generally, a constant bit rate is desired for consistent visual quality. A rate control algorithm may dynamically adjust encoding parameters, most notably the quantization parameter, for the current frame according to the bit budget and statistics of the current frame and along with the encoded input video data generate pixel information for the input video data.

The pixel information may be provided to and entropy coder 450 and a deblocker 440. The entropy coder 450 may be configured to further compress the video data generated by the encoding process. For example, the entropy coder 450 may be configured to apply a Huffman coding to compress the video data.

The deblocker 440 may be configured to further process the video data by identifying and removing blocking artifacts. The transformer/quantizer and rate control unit 430 may, as a result of compression for instance, introduce block artifacts to the video data. The deblocker 440 may be configured to smooth these blocking artifacts to improve the visual quality of the video data. For example, the deblocker may be configured to filter the transformed input video data to remove visual blocking artifacts. The deblocker 440 may be configured to provide the deblocked video data to a write data mover 460. The write data mover 460 shown is configured to store the encoded video data 490, such as in a memory location.

The deblocker 440 may also provide the deblocked video data to the downscaler 300. In this way, a downscaled version of the encoded raw video data 402 may be generated. The current and/or reference frames obtained by the frame encoding prefetch 410 may be provided to the downscaler 300. Thus, the downscaler 300 may generate the downscaled version based on one or both of the deblocked version of the raw video data and the original reference and/or current frame obtained by the frame encoding prefetch 410. The downscaler 300 is configured to provide the downscaled version to the write data mover 460. The write data mover 460 may be further configured to store the downscaled version of the encoded video data 490.

The video encoder 400 shown in FIG. 4 generates entropy encoded version of the raw video data, a deblocked encoded version of the raw video data, and a downscaled deblocked encoded version of the raw video data. It will be understood that the write data mover 460 may be configured to selectively store one or both of the downscaled and non-downscaled deblocked encoded versions. For example, if the device which includes the video encoder 400 has limited resources (e.g., memory, power), it may be desirable to avoid storing the full deblocked encoded version and instead store only the downscaled version.

Figure 5:
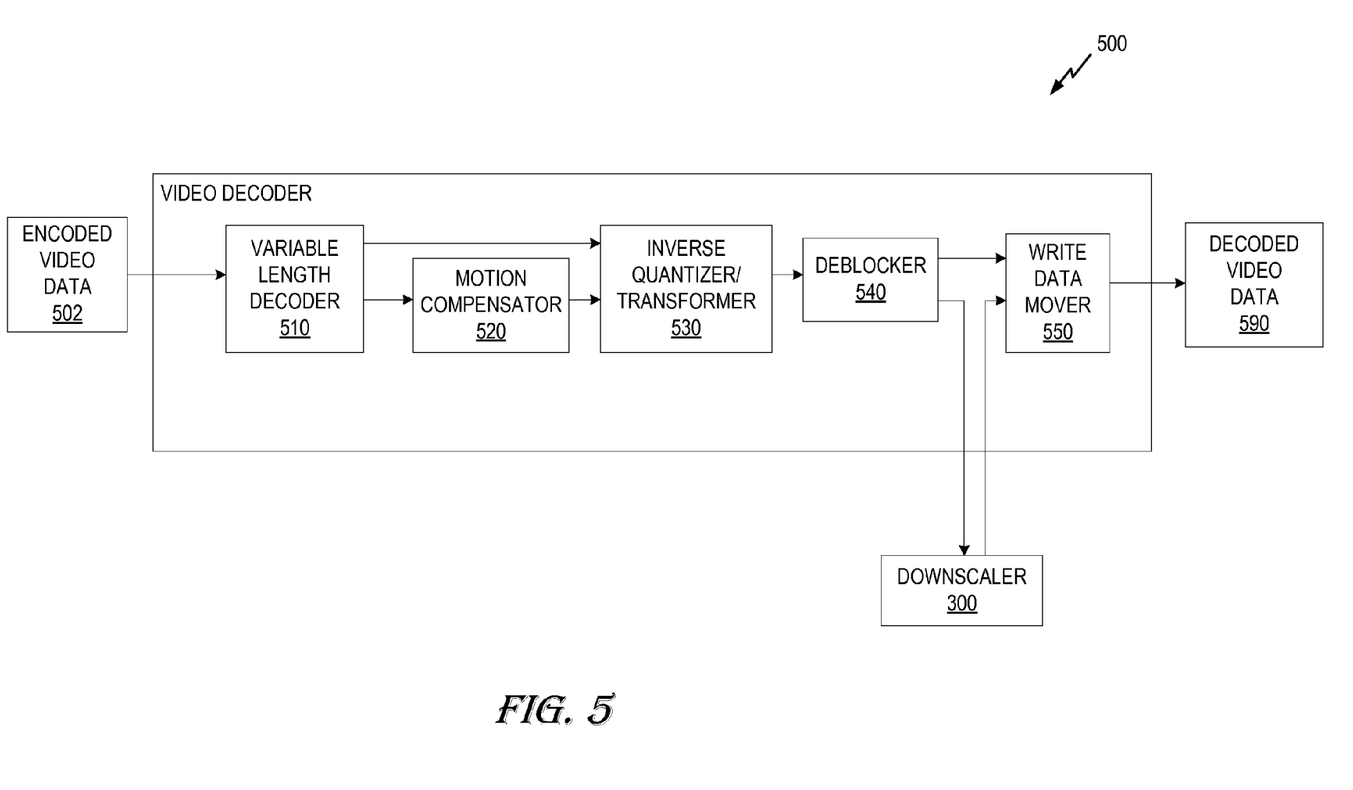
FIG. 5 shows a functional block diagram of an exemplary video decoder.

FIG. 5 shows a functional block diagram of an exemplary video decoder. The video decoder 500 may be configured to decode encoded video data 502. The encoded video data 502 may be received by a destination device 16 as described in FIG. 1.

The video decoder 500 shown includes a variable length decoder 510. The variable length decoder 510 may be configured to decompress the symbols included in the encoded video data 502. The decompressed information may be provided to a motion compensator 520. The motion compensator may be configured to reconstruct the input video data. The motion compensated video data and the variable length decoded video data may be provided to an inverse quantizer/transformer 530. The inverse quantizer/transformer 530 may be configured to further decompress the video data. Based on the motion compensated input video data and the decoded input video data, the inverse quantizer/transformer 530 may generate pixel values for the video data.

As discussed above with reference to FIG. 4, blocking artifacts may be introduced by, for example, the encoding and decoding processes. A deblocker 540 may be included in the video decoder 300 to remove such blocking artifacts. The deblocker 540 may be configured to provide the decoded and deblocked video data to a write data mover 550. The write data mover 550 may perform similar functions to the write data mover 460 included in the video encoder 400. For instance, the write data mover 550 may be configured to provide the decoded video data 590. Providing the decoded video data 590 may include storing the decoded video data 590 in a memory, transmitting the decoded video data 590 via a transceiver, or providing the decoded video data 590 for display. The deblocker 540 may also provide the deblocked decoded video data to the downscaler 300. The downscaler 300 may generate a downscaled version of the decoded and deblocked video data. The downscaled version may be provided to the write data mover 550 and processed as described above.

Figure 6:
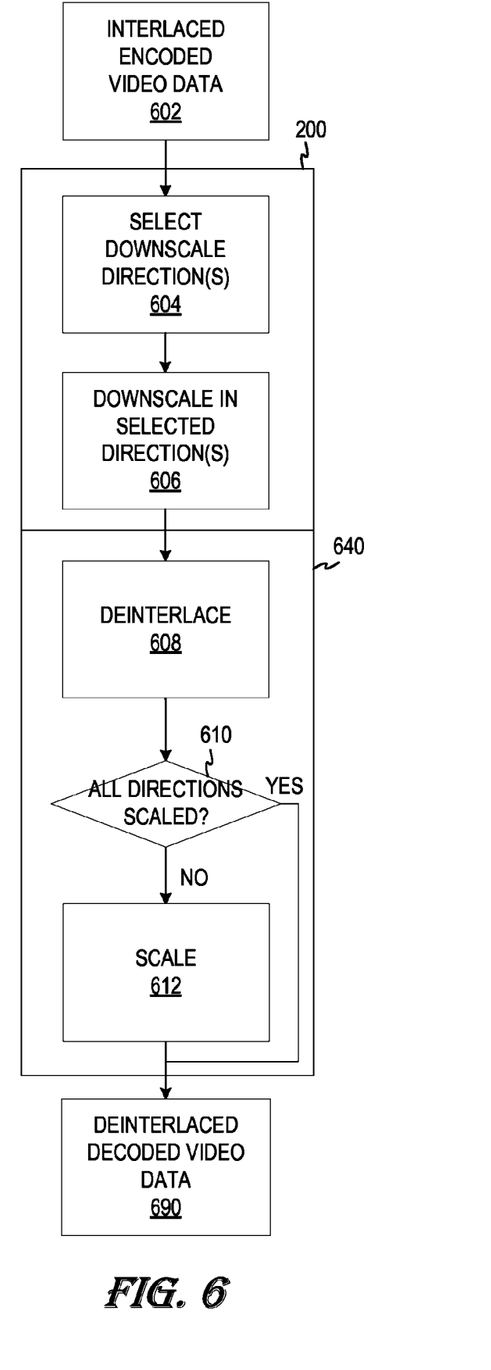
FIG. 6 shows a process flow diagram for an exemplary method of decoding with integrated downscale of interlaced video data.

FIG. 6 shows a process flow diagram for an exemplary method of decoding with integrated downscale of interlaced video data. Interlaced encoded video data 602 is provided as an input. At node 604, the video core 200 selects downscale direction(s). The selection may be performed in the downscaler 300 of the video core 200. The selection may be based on scaling configuration, attribute of the video data (e.g., encoding format/method, bitrate, content type), video core 200 configuration, and the like. The downscale direction may be horizontal and/or vertical downscaling.

At node 606, the downscaler 300 downscales the interlaced encoded video data 602 in the selected downscale direction(s). The downscaled version may be provided to a media display platform 640 such as a display, monitor, set top box, or other device configured to present the video data. At node 608, the media display platform 640 deinterlaces the video data. At decision node 610, a determination is made as to whether the video data has been scaled in all directions. If the video has been scaled in all directions (e.g., the downscaler 300 was configured to horizontally and vertically downscale), deinterlaced decoded video data 690 is provided. If the video data has not been fully downscaled, at note 612, the video data is further scaled. The determination may be based on the number of pixels in the provided video data. The determination may be further based on a configurable preferred ratio of pixels for the deinterlaced decoded video data 690.

As one example, the interlaced encoded video data 602 may be 1920 by 1080 interlaced video data. The downscaler 300 may be configured to horizontally downscale to 854 pixels. Accordingly, the video core 200 may provide an interlaced 854 by 1080 decoded video data to the media display platform 640. The media display platform 640 may be configured to deinterlace this version of the video data. The deinterlacing may not change the aspect ratio of the video data. Accordingly, the media display platform 640 now has a 854 by 1080 deinterlaced version of the video. The media display platform may then determine that the dimensions of the video data do not match a configured resolution for a display associated with the media display platform 640. Accordingly, the media display platform 640 may perform further vertical scaling to bring the video to the desired 854 by 480 resolution. Other dimensions may be implemented without departing from the scope of the disclosure.

The method shown in FIG. 6 allows the video core 200 to perform initial downscaling for the video data. This may provide several benefits to the media display platform 640 such as performing calculations in video core 200 hardware and providing an initial downscale which may simplify the subsequent scaling of the video data. Furthermore, because the downscaled image is smaller, the amount of data transmitted from the video core 200 to the media display platform 640 is reduced which may conserve resources in providing the video data to the media display platform 640.

Figure 7:
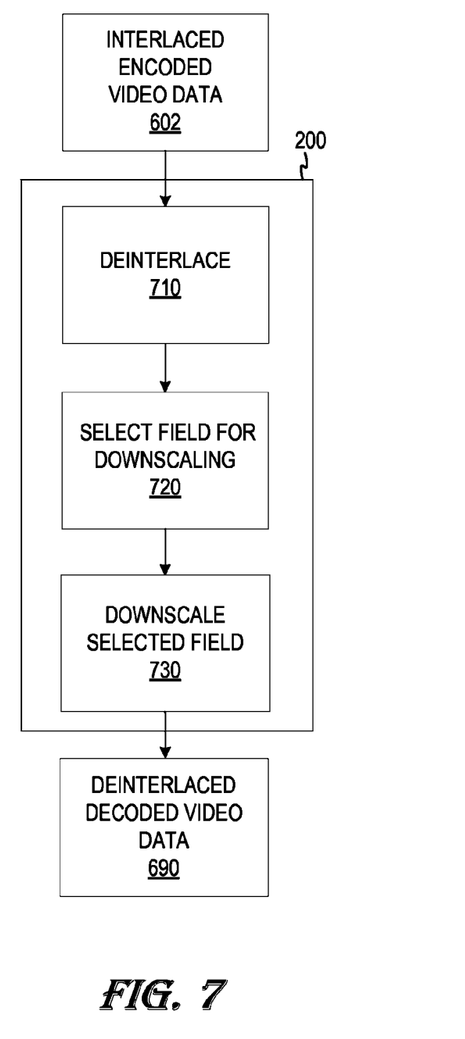
FIG. 7 shows another process flow diagram for an exemplary method of decoding with integrated downscale of interlaced video data.

FIG. 7 shows another process flow diagram for an exemplary method of decoding with integrated downscale of interlaced video data. The interlaced encoded video data 602 is provided to the video core 200. At node 710, the interlaced encoded video data is deinterlaced. In one implementation, the deinterlacing may produce two fields each including 1920 by 540 pixels. At node 720, a field is selected for downscaling. The selection may be based on the video data, configuration of the video core 200, or other factor. At node 730, the selected field is downscaled as described above to produce the deinterlaced decoded video data 690. The unselected field may be discarded from further downscaling processing. In the implementation where the field is a 1920 by 540 field, the video produced by the downscaling of node 730 may be an 854 by 480 downscaled version.

It should be noted that the methods described in reference to FIG. 6 and FIG. 7 are not mutually exclusive. For instance, depending on the media display platform 640, the video core 200 may be configured to selectively perform the processes shown. Consider a media display platform 640 which is not configured to deinterlace or cannot perform scaling. In such implementations, it may be desirable to configure the video core 200 to perform the process shown in FIG. 7. At another time, the media display platform 640 may be coupled with a device configured to deinterlace and scale. Accordingly, it may be preferable to allow the media display platform 640 to offload the tasks of deinterlacing and subsequent scaling from the video core 200.

The selection may also be video core 200 centered. For example, during times when the video core 200 is under a low load (e.g., not much processing or memory utilization), it may be desirable to configure the video core 200 to perform the process shown in FIG. 7. However, if the video core 200 experiences higher utilization levels, it may be desirable to offload processing tasks such as shown in FIG. 6.

Table 1 below includes experimental data illustrating some of the improvements which may be achieved through the integrated downscaling systems and methods described. The experiments assume a content rate of 30 frames per second, a refresh rate of 60 frames per second, and 1.5 bytes per pixel. The pixel includes a 4:2:0 ratio of luminance to chrominance blue to chrominance red. The experiments were performed using 1920 by 1080 reference video. The display standard refers to the video display standard under test with corresponding display dimensions provided. The integrated downscale (IDS) video core reference (ref) frame write bandwidth (BW) is shown in megabytes per second. The IDS video code display (disp) frame write bandwidth (BW) is also reported in megabytes per second. The media display platform (MDP) display frame read bandwidth is also shown in megabytes per second.

TABLE 1

| Display Standard | Display Width | Display Height | IDS Video Core Ref Frame Write BW (MBps) | IDS Video Core - Disp Frame Write BW (MBps) | MDP - Disp Frame Read BW (MBps) | BW savings with IDS enabled (%) | Scale ratio (x-dir) | Scale ratio (y-dir) |
|---|---|---|---|---|---|---|---|---|
| WUXGA | 1920 | 1200 | 93.312 | 93.312 | 186.624 | 0 | 1.00 | 1.11 |
| HD 1080 | 1920 | 1080 | 93.312 | 93.312 | 186.624 | 0 | 1.00 | 1.00 |
| WSXGA+ | 1600 | 1200 | 93.312 | 86.400 | 172.800 | 0 | 0.83 | 1.11 |
| UGA | 1680 | 1050 | 93.312 | 79.380 | 158.760 | 0 | 0.88 | 0.97 |
| SXGA+ | 1400 | 1050 | 93.312 | 66.150 | 132.300 | 0 | 0.73 | 0.97 |
| SXGA | 1280 | 1024 | 93.312 | 58.982 | 117.965 | 5.185 | 0.67 | 0.95 |
| WXGA | 1280 | 800 | 93.312 | 46.080 | 92.160 | 25.926 | 0.67 | 0.74 |
| HD 720 | 1280 | 720 | 93.312 | 41.472 | 82.944 | 33.333 | 0.67 | 0.67 |
| XGA | 1024 | 768 | 93.312 | 35.389 | 70.779 | 43.111 | 0.53 | 0.71 |
| WSVGA | 1024 | 600 | 93.312 | 27.648 | 55.296 | 55.556 | 0.53 | 0.56 |
| WVGA | 864 | 480 | 93.312 | 18.662 | 37.325 | 70.000 | 0.45 | 0.44 |
| VGA | 640 | 240 | 93.312 | 6.912 | 13.824 | 88.889 | 0.33 | 0.22 |
| QVGA | 320 | 240 | 93.312 | 3.456 | 6.912 | 94.444 | 0.17 | 0.22 |

For the high resolution target displays, such as WUXGA, HD 1080, WSXGA+, UGA, and SXGA+, little if any savings were found. This would be expected as the amount of downscaling performed for these displays is little if any. However, as the amount of downscaling that is used for a target display increases, the amount of savings becomes quite significant. The efficiencies shown in Table 1 refer to bandwidth advantages which may manifest as bus and/or memory bandwidth efficiencies. These are merely provided as an example and additional non-limiting benefits are provided by the described systems and methods. For example, the same downscaler may be integrated and selectively used for both encoding and decoding downscaling. This provides a reduction in physical footprint of a device as the same component may be utilized by the encoder and the decoder. This may also reduce the cost to produce a video core as the downscaler may be included on the same core whether integrated in a source video device, in a destination video device, or in a hybrid device (e.g., capable of capturing and displaying video).

Figure 8:
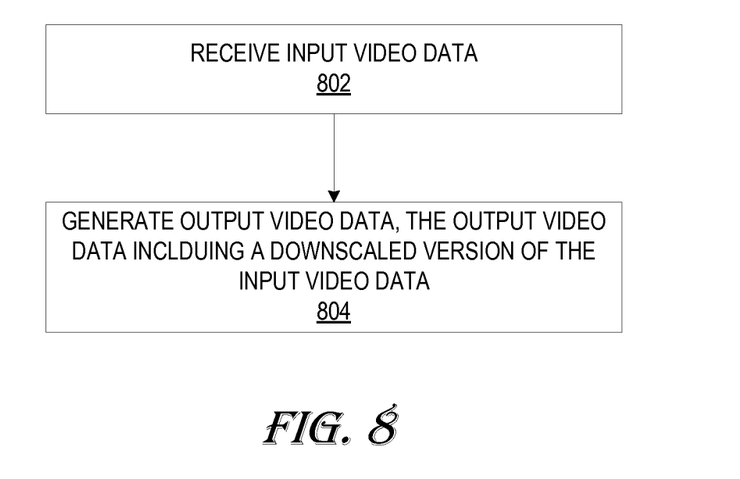
FIG. 8 shows a flowchart for an exemplary method of processing video data.

FIG. 8 shows a flowchart for an exemplary method of processing video data. The method may be implemented in one or more of the devices described herein, such as the video core 200.

At node 802, input video data is received. The receiving may be wired or wireless reception. The receiving may include receiving the input video data from a sensor such as a camera and/or from a memory.

At node 804, output video data is generated. Generating the output video data includes selectively encoding and decoding the input video data. A downscaled version of the input video data is generated during the encoding or decoding and the output video data includes the downscaled version of the input video data.

Figure 9:
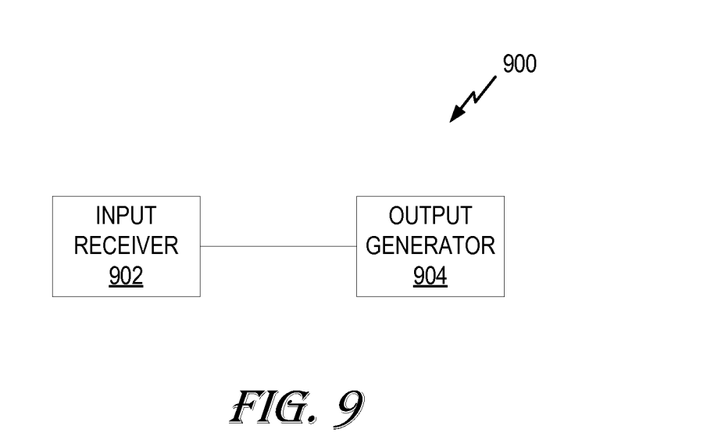
FIG. 9 shows a functional block diagram of an exemplary electronic device for processing video data.

FIG. 9 shows a functional block diagram of an exemplary electronic device for processing video data. Those skilled in the art will appreciate that an electronic device may have more components than the simplified video processing device 900 shown in FIG. 9. The video processing device 900 shows only those components useful for describing some prominent features of implementations within the scope of the claims. The video processing device 900 includes an input receiver 902 and an output generator 904.

The input receiver 902 is configured to receive input video data. The input receiver 902 may include one or more of an antenna, a signal processor, a network interface, a memory, and a peripheral interface. In some implementations, means for receiving input video data include the input receiver 902.

The output generator 904 is configured to generate output video data. Generating the output video data includes selectively encoding and decoding the input video data. A downscaled version of the input video data is generated during the encoding or decoding and the output video data includes the downscaled version of the input video data. The output generator 904 may be implemented using one or more of a video encoder, a video decoder, a downscaler, a motion compensation and estimation unit, a quantizer, a transformer, a rate control unit, a memory, a processor, a write data mover, a network interface, and a buffer. In some implementations, means for generating output video may include the output generator 904.

Those having skill in the art will further appreciate that the various illustrative logical blocks, modules, circuits, and process steps described in connection with the implementations disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. One skilled in the art will recognize that a portion, or a part, may comprise something less than or equal to a whole. For example, a portion of a collection of pixels may refer to a sub-collection of those pixels.

The various illustrative logical blocks, modules, and circuits described in connection with the implementations disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or process described in connection with the implementations disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of non-transitory storage medium known in the art. An exemplary computer-readable storage medium is coupled to the processor such the processor can read information from, and write information to, the computer-readable storage medium. In the alternative, the storage medium may be integral to the processor. The processor and the storage medium may reside in an ASIC. The ASIC may reside in a user terminal, camera, or other device. In the alternative, the processor and the storage medium may reside as discrete components in a user terminal, camera, or other device.

As used herein, the terms "determine" or "determining" encompass a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

As used herein, the terms "provide" or "providing" encompass a wide variety of actions. For example, "providing" may include storing a value in a location for subsequent retrieval, transmitting a value directly to the recipient, transmitting or storing a reference to a value, and the like. "Providing" may also include encoding, decoding, encrypting, decrypting, validating, verifying, and the like.

Moreover, the word "exemplary" is used herein to mean "serving as an example, instance, or illustration." Any embodiment described herein as "exemplary" is not necessarily to be construed as preferred or advantageous over other embodiments.

As used herein, a phrase referring to "at least one of" a list of items refers to any combination of those items, including single members. As an example, "at least one of: a, b, or c" is intended to cover: a, b, c, a-b, a-c, b-c, and a-b-c.

The previous description of the disclosed implementations is provided to enable any person skilled in the art to make or use the present invention. Various modifications to these implementations will be readily apparent to those skilled in the art, and the generic principles defined herein may be applied to other implementations without departing from the spirit or scope of the invention. Thus, the present invention is not intended to be limited to the implementations shown herein but is to be accorded the widest scope consistent with the principles and novel features disclosed herein.

What is claimed is:

1. An electronic device for processing video data, the device comprising:
   a receiver configured to receive input video data; and
   a video coder configured to generate output video data, the video coder including:
      a video encoder;
      a video decoder;
      the video encoder and the video decoder each comprising a deblocker arranged to generate deblocked video data; and
      a downscaler coupled with the deblocker of each of the video encoder and the video decoder, wherein the downscaler is coupled with each deblocker to receive the deblocked video data, and wherein the downscaler is configured to generate a downscaled version of the deblocked video data received from either the video encoder or the video decoder during encoding or decoding based on scaling configuration of a target display device, wherein the output video data includes the downscaled version of the input video data.

2. The device of claim 1, wherein the input video data comprises interlaced video data.

3. The device of claim 2, wherein generating the downscaled version of the input video data comprises:
   determining at least one downscaling direction of a plurality of downscale directions, the plurality of downscale directions comprising horizontal downscaling and vertical downscaling; and
   downscaling the interlaced video data based on a deinterlacing capability of the target display device, wherein generating the output video data comprises:
      deinterlacing the downscaled interlaced video data; and
      scaling the deinterlaced video data according to the determined at least one downscaling direction.

4. The device of claim 2, wherein the input video data is deinterlaced to produce both a first deinterlaced version of the input video data and a second deinterlaced version of the input video data, wherein said deinterlacing to produce both the first deinterlaced version and the second deinterlaced version is based on a deinterlacing capability of the target display device, and
   wherein generating the downscaled version of the input video data comprises:
      receiving the first deinterlaced version of the input video data and the second deinterlaced version of the input video data;
      selecting one of the first deinterlaced version and the second deinterlaced version of the input video data; and
      scaling the selected deinterlaced version of the input video data.

5. The device of claim 1, further comprising a transmitter configured to transmit at least one version of the output video data.

6. The device of claim 1, wherein the downscaler is configured to selectively downscale along at least one of a horizontal dimension and a vertical dimension of the input video image.

7. The device of claim 1, wherein the downscaler is further configured generate the downscaled version based at least in part on dimensions of the target display device, available bandwidth for transmitting data to the target display device, and resource availability for the electronic device.

8. The device of claim 7, wherein the resource availability for the electronic device comprises at least one of power, processing, memory, and bus availability.

9. A method of processing video data, the method comprising:
   receiving first input video data, the first input video data being encoded;
   decoding the first input video data to generate first output video data, wherein generating the first output video data comprises obtaining first deblocked video data for the first input video data and downscaling the first deblocked video data to generate a first downscaled version of the first input video data during the decoding, wherein the downscaling is based on scaling configuration of a target display device, wherein the first output video data includes the first downscaled version of the first input video data;

receiving second input video data, the second input video data being decoded; and encoding the second input video data to generate second output video data, wherein generating the second output video data comprises obtaining deblocked video data for the second input video data and downscaling the deblocked video data for the second input video data to generate a downscaled version of the second input video data during the encoding, wherein the downscaling is based on the scaling configuration of the target display device, wherein the second output video data includes the second downscaled version of the second input video data.

10. The method of claim 9, wherein at least one of the first input video data and the second input video data comprises interlaced video data.

11. The method of claim 10, wherein generating at least one of the first downscaled version of the first input video data or the downscaled version of the second input video data comprises:

determining at least one downscaling direction of a plurality of downscale directions, the plurality of downscale directions comprising horizontal downscaling and vertical downscaling; and downscaling the interlaced video data based on a deinterlacing capability of the target display device, wherein generating at least one of the first output video data or the second output video data comprises:

deinterlacing the downscaled interlaced video data; and scaling the deinterlaced video data according to the determined at least one downscaling direction.

12. The method of claim 10, comprising deinterlacing at least one of the first input video data or the second input video data to produce both a first deinterlaced version of deinterlacing the at least one of the first input video data or the second input video data and a second deinterlaced version of deinterlacing the at least one of the first input video data or the second input video data, wherein said deinterlacing to produce both the first deinterlaced version and the second deinterlaced version is based on a deinterlacing, capability of the target display device, wherein generating the downscaled version of the at least one of the first input video data or the second input video data comprises:

receiving the first deinterlaced version of the at least one of the first input video data or the second input video data and the second deinterlaced version of the at least one of the first input video data or the second input video data;

selecting one of the first deinterlaced version and the second deinterlaced version of the at least one of the first input video data or the second input video data; and scaling the selected deinterlaced version of the at least one of the first input video data or the second input video data.

13. The method of claim 9, further comprising transmitting at least one version of the first output video data and at least one version of the second output video data.

14. The method of claim 9, wherein generating the first downscaled version comprises selectively downscaling along at least one of a horizontal dimension and a vertical dimension of the first input video image, and wherein generating the downscaled version comprises selectively downscaling along at least one of a horizontal dimension and a vertical dimension of the second input video image.

15. The method of claim 9, wherein generating the first downscaled version and generating the downscaled version are further based at least in part on dimensions of the target display device, available bandwidth for transmitting data to the target display device, and resource availability.

16. The method of claim 15, wherein the resource availability comprises at least one of power, processing, memory, and bus availability.

17. An electronic device for processing video data, the device comprising:

means for receiving input video data;

means for encoding first input video data;

means for decoding second input video data, the means for encoding and the means for decoding each comprising means for generating deblocked video data; and means for downscaling input video data coupled with the means for generating deblocked video data of each of the means for encoding and the means for decoding, the means for downscaling coupled with each means for generating deblocked video data, the means for downscaling configured to generate a downscaled version of the deblocked video data received from either the means for encoding or the means for decoding during the encoding or decoding based on scaling configuration of a target display device, wherein the output video data includes the downscaled version of the input video data.

18. A non-transitory computer-readable storage medium comprising instructions executable by a processor of an apparatus, the instructions causing the apparatus to:

receive first input video data, the first input video data being encoded;

decode the first input video data to generate first output video data, wherein generating the first output video data comprises obtaining first deblocked video data for the first input video data and downscaling the first deblocked video data to generate a first downscaled version of the first input video data during the decoding, wherein the downscaling is based on scaling configuration of a target display device, wherein the first output video data includes the first downscaled version of the first input video data;

receive second input video data, the second input video data being decoded; and encode the second input video data to generate second output video data, wherein generating the second output video data comprises obtaining deblocked video data for the second input video data and downscaling the deblocked video data for the second input video data to generate a downscaled version of the second input video data during the encoding, wherein the downscaling is based on the scaling configuration of the target display device, wherein the second output video data includes the second downscaled version of the second input video data.

* * * * *